United States Patent [19]

Kay et al.

[11] Patent Number: 5,862,411
[45] Date of Patent: Jan. 19, 1999

[54] SYSTEM USING A VARIABLE TIMER TO OPTIMALLY ADJUST ISSUING A START DATA COLLECTION SIGNAL AT NEAR THE BEGINNING OF DATA TRANSMISSION SIGNAL

[75] Inventors: James J. Kay, Eastlake; Peter J. Boldt, W. Farmington, both of Ohio

[73] Assignee: Allen Bradley Company, Inc., Milwaukee, Wis.

[21] Appl. No.: 664,967

[22] Filed: Jun. 10, 1996

[51] Int. Cl.$^6$ .............................. G06F 1/14; G06F 13/14
[52] U.S. Cl. .................... 395/878; 395/826; 395/849; 395/559; 375/354
[58] Field of Search ................... 395/557, 878, 395/826, 849, 559; 375/354; 370/448, 248; 250/374; 307/141

[56] References Cited

U.S. PATENT DOCUMENTS

| | | |
|---|---|---|
| 4,332,027 | 5/1982 | Malcolm et al. .................. 370/448 |
| 4,605,859 | 8/1986 | DiIanni et al. .................... 250/374 |
| 4,672,233 | 6/1987 | Scott ................................. 307/141 |
| 5,140,622 | 8/1992 | Shino et al. ....................... 377/20 |
| 5,491,531 | 2/1996 | Adams et al. .................... 375/354 |
| 5,537,549 | 7/1996 | Gee et al. ..................... 395/200.54 |
| 5,587,995 | 12/1996 | Takebe et al. .................... 370/248 |
| 5,598,555 | 1/1997 | Ito ................................... 395/557 |

*Primary Examiner*—Le Hien Luu
*Attorney, Agent, or Firm*—Mark S. Svat; John M. Miller; John J. Horn

[57] ABSTRACT

A controller based network, where data from a plurality of nodes is placed onto the network in a scheduled predetermined order during a network update interval. The data transmitted onto the network being collected following the issuance of a data collection start signal issued in accordance with a timer, whereby the issuance of the data collection start signal can be varied within the network update interval. The collected data being transmitted onto the network upon the issuance of a data transmission signal.

19 Claims, 6 Drawing Sheets

| TEST SETUP | PHASE 1.0 PLC-5/C PEER TO PEER | JITT PLC-5/C PEER TO PEER | PHASE 1.0 PLC-5/C TO 1771-ACN | JITT PLC-5/C TO 1771-ACN |
|---|---|---|---|---|
| NUT 20 MS / SCAN 4 MS | 76,85,72 | 37,44,32 | 77,88,72 | 37,41,30 |

FIG. 6

SYSTEM USING A VARIABLE TIMER TO OPTIMALLY ADJUST ISSUING A START DATA COLLECTION SIGNAL AT NEAR THE BEGINNING OF DATA TRANSMISSION SIGNAL

BACKGROUND OF THE INVENTION

This application pertains to the art of data transmission and more particularly data transmission for a controller based network. The invention is particularly applicable to a controller based network where data representing the status of events and devices is collected and periodically transmitted on to and from the network during scheduled time periods. The transmitted data is used in the generation of control commands for the monitored events and devices. However, it will be appreciated that the invention has broader applications for use in a variety of control systems transmitting data on a scheduled periodic basis.

Controller based networks employ sensors to monitor a wide range of events and devices and their associated physical characteristics including changes in pressure, flow, strain, temperature, time and state changes, among others. The data gathered by the sensors is placed onto the controller based network and provided to the controller, which analyzes the data and generates an appropriate output. The output can cause switches and valves to open and/or close, turn motors and pumps on and/or off, transmit additional data, or cause a temperature to increase and/or decrease, among other numerous and varied actions. By considering the manner in which data acquired by a sensor is transmitted onto a controller based network, existing networks can be divided into categories. A first of which is known as a Carrier Sense Multiple Access (CSMA) network. When data for this network is acquired, there is an immediate attempt to place the data onto the network, with a number of nodes attempting to access the network at the same time raising the possibility of data collision. If data acquired by a sensor cannot be immediately placed on the network, it is queued in a buffer while attempts to gain access are made. In an attempt to avoid these collisions, complex algorithms are employed which prioritize data and judge competing contentions. Therefore, a CSMA network is a "free-for-all" type system where it is not possible to predict when data from a particular node will gain access to the network.

Another category of network, based on the manner of data transmission, and to which the subject invention is directed, is a scheduled controller based network where data access to the network is performed at periodic scheduled times. In this type of network data is transmitted in a predetermined order during a network update interval (NUI). Data from a node follows data from a preceding node such that there is no attempt to access the network prior to conclusion of transmission of data from a proceeding scheduled node. By this arrangement, data collisions occurring during contention for access to the network are avoided. Though access is controlled, the network update time (NUT) for an individual node can vary. Particularly, the transmission time of data from a specific node will vary within set parameters, however, the order in which data from the nodes is transmitted is accomplished according to a preset schedule.

Existing networks of the second category have a characteristic of being conservative in determining when data is collected for a scheduled transmission to the network. This conservative approach is beneficial since attempting to collect data at too late a point in a network update interval (NUI) can result in there not being sufficient time to complete data collection before data is to be transmitted, requiring the data to wait for a next NUI. Thus, data may not be transmitted at all, or older than desired data may be transmitted, this also creates data jitter by disrupting the periodic deterministic nature of the data.

FIG. 1 illustrates a block diagram of a scheduled controller based network A as discussed above. Sensors $10a$–$10n$ acquire data that is input to adapter 12, which is an input/output device. An adapter of the type shown in FIG. 1 has the capability of concentrating a plurality of inputs and outputs to and from sensors $10a$–$10n$. Adapter 12 may be one of Allen Bradley Corporation's 1771 family of adapters used in Allen Bradley Corporation's controller based networks such as the ControlNet network. ControlNet is a trademark of Allen Bradley Corporation. It is to be appreciated that while adapter 12 is used in this embodiment, other input/output devices which acquire sensed data may also be used.

Adapter 12 transmits the collected data onto network A. Controller 14, which operates program 16, uses the received data to determine the status of events or devices which are controlled by network A. Based on the received data, controller 14 transmits a command to adapter 18, which then provides the command to actuators $20a$–$20n$ used to adjust the operation of the events or devices controlled by network A.

As an example of the operation of network A, actuation of a switch (not shown) is sensed by sensor $10a$. This data is input into a digital input card (not shown), and is transmitted onto network A through adapter 12. The data is passed to controller 14 which uses this information to generate a command to turn off a pump (not shown) by actuator $20a$.

Controller 14 may be one of Allen Bradley Corporation's PLC-5/C series of controllers, however, it is to be appreciated that other controllers may also be used.

FIG. 2 illustrates the flow of data within network A of FIG. 1, including the scheduled periodic transmission of data and data collection. Two constant ten (10) millisecond network update intervals (NUIs) 30, 31 are shown in the figure. At the beginning of the first network update interval (NUI) 30 a tone 32 indicates the start of a periodic interval for communication (PIC). Following tone 32, transmission of data begins, with nodes 0–4 $34_{0-4}$ scheduled for transmission. Nodes 0–4 $34_{0-4}$ correspond to the devices, etc. monitored by sensors $10a$–$10n$. The node transmission time during the first network update interval 30 is slightly longer than 3 milliseconds. Upon completion of data transmission by the fourth node $34_4$, an interrupt 37 is issued by controller 14 of FIG. 1. Interrupt 37 also doubles as a data collection start (DCS) signal. Therefore, issuing of interrupt 37 signifies not only that the scheduled data transmission of nodes 0–4 $34_{0-4}$ has been completed, but also that collection of data for the next scheduled transmission during network update interval 31 is to begin. Interrupt 37 may be considered to be a fixed signal in that controller 14 is configured to issue interrupt 37 substantially immediately following the end of data transmission.

Thereafter, when tone 32 is again issued, transmission of data from nodes 0–4 $34_{0-4}$ again takes place and the same procedure is repeated upon the issuance of interrupt, data collection start (DCS) signal, 37.

As illustrated by FIG. 2, while there may be a variability in the data transmission time such as from slightly more than 3 milliseconds during the first NUI 30 to slightly more than 0.5 milliseconds for data transmission during the second NUI 31, the transmissions from the nodes occur in a scheduled predetermined order, avoiding conflicts and arbitration problems between the data from the nodes.

Existing networks are considered conservative in data collection since data collection starts substantially immediately following the end of data transmission thereby leaving a maximum time for data collection prior the next tone 32. This conservative approach is beneficial in that it avoids having insufficient time to form data transmission packets needed for data transmission. However, a drawback which exists due to this early data acquisition is the possibility that data from a location which has already been read may be updated with more recent information. In this case, older than desired data may be sent during data transmission. Also, if data is missed and not sent during a first NUI, the time until the data is sent during a next NUI is extended, thereby causing data jitter.

It has been determined to be desirable to provide a timer in the scheduled controller based network to allow for issuing of a time variable data collection signal which indicates the beginning of data collection. The present invention, therefore, contemplates using a time variable data collection start signal to build a frame of scheduled transmission packets just before they are needed for transmission.

SUMMARY OF THE INVENTION

In accordance with the present invention, a controller based network is configured to provide just in time data transmission through the use of a timer. The timer is adjusted to start collection of data for a next scheduled data transmission at a time near the beginning of a data transmission start signal. The timer signal is issued close enough to the start of data transmission so as to provide fresh data, and to minimize the delay time in throughput should data not be available during a data transmission period, but with sufficient time to allow for complete collection and formation of the data to be transmitted.

In accordance with another aspect of the present invention, the timer is implemented as a separate hardware device.

In accordance with another aspect of the subject invention, the timer is software implemented using hardware existing in the controller.

An advantage of the present invention is provided in increasing the freshness of data used by the controller based network.

Yet another advantage of the present invention is when data is not collected during a data transmission period. The time until the data will next be transmitted to the controller based network is minimized.

Further advantages, such as elimination of data jitter, may become apparent to one of ordinary skill in the art upon reading and understanding the subject specification.

BRIEF DESCRIPTION OF THE DRAWINGS

This invention may take physical form in certain parts and arrangements of parts, or the practice of certain steps, a preferred embodiment of which will be described in detail in this specification and illustrated in the accompanying drawings which form a part hereof and wherein.

DETAILED DESCRIPTION OF THE PREFERRED EMBODIMENT

Figure 3:
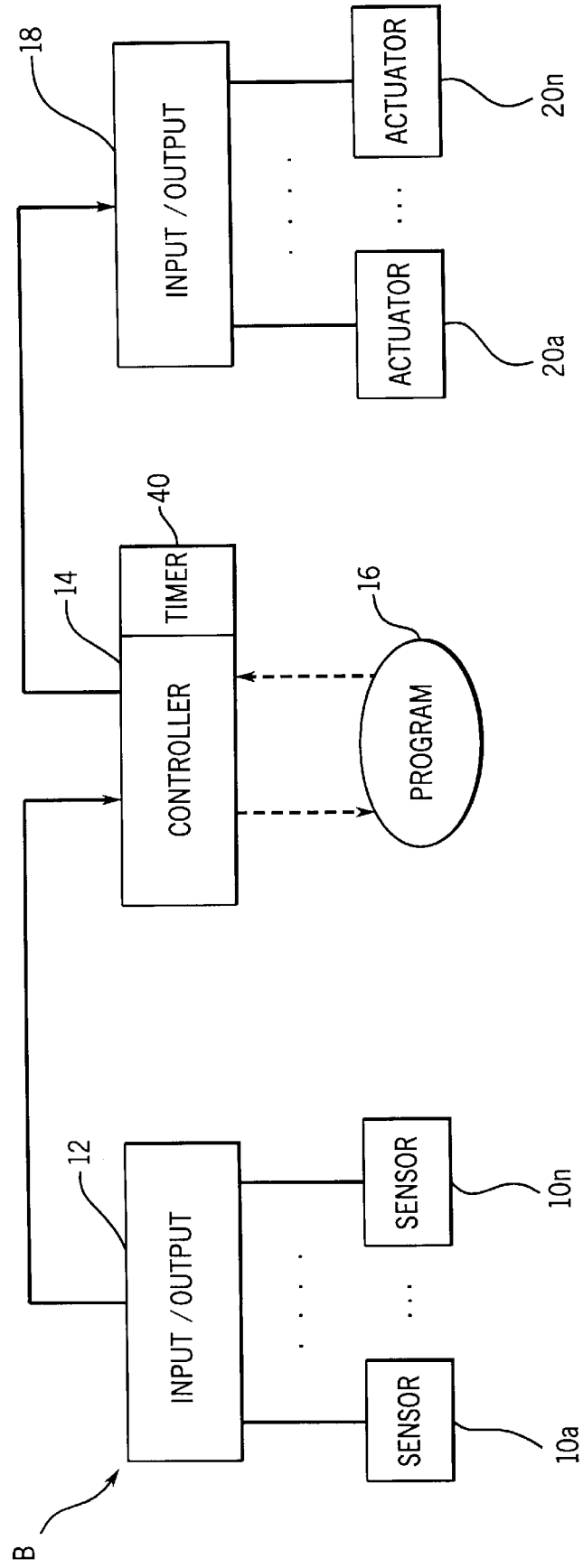
FIG. 3 is a block diagram of a controller based network according to the subject invention.

Referring now to the drawings wherein the showing are for purposes of illustrating the preferred embodiment of the invention only, and not for purpose of limiting same, FIG. 3 illustrates a block diagram of a controller based network B according to the subject invention. This diagram is somewhat similar to that of FIG. 1, however, also included is timer 40.

Figure 1:
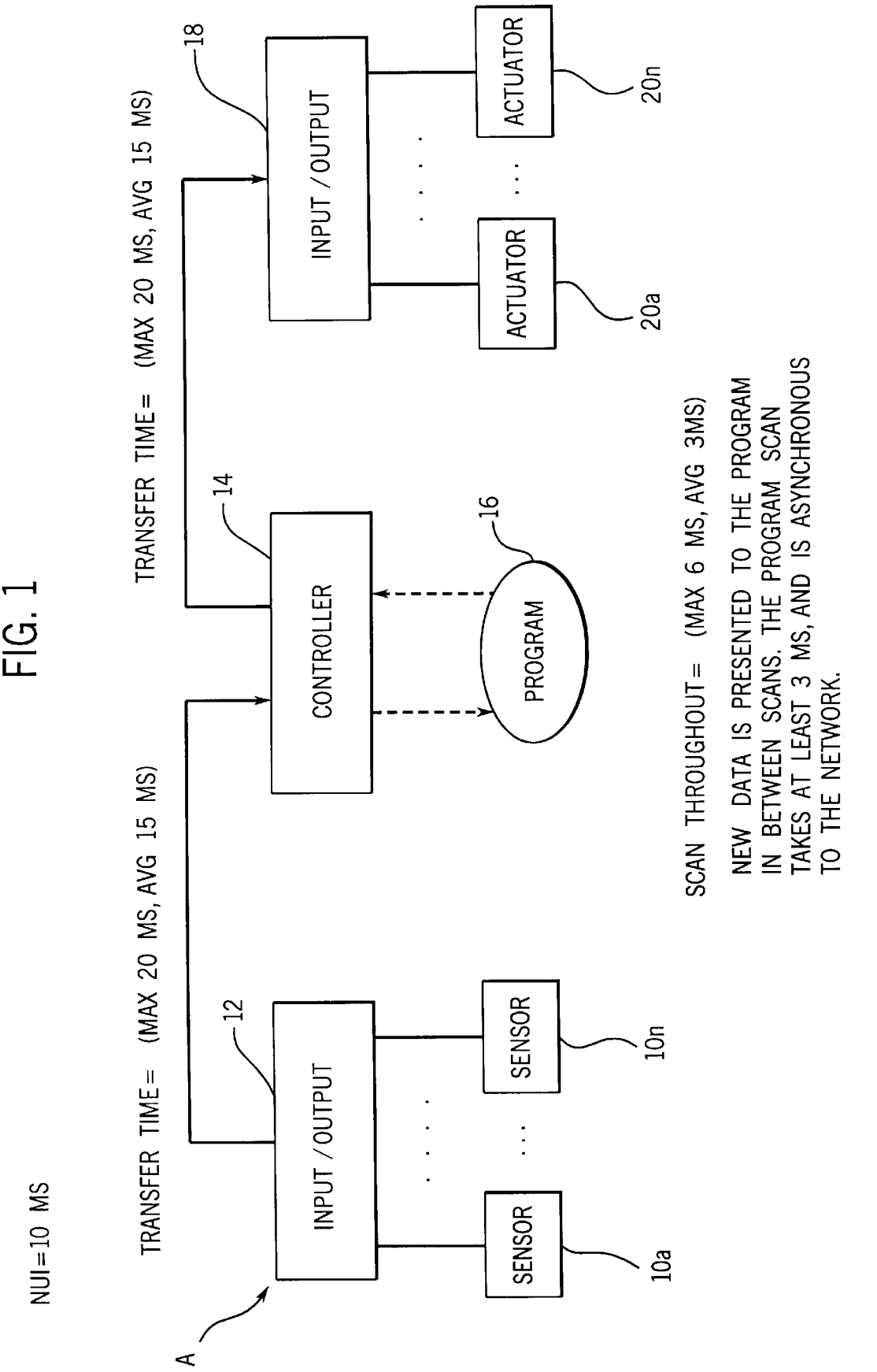
FIG. 1 is a block diagram of a structured controller based network having defined periods when data from nodes can be transmitted to the network.

Using the Allen Bradley components discussed above and for a NUI of 10 milliseconds, network A of FIG. 1 has a maximum data input to output time of 46 milliseconds and an average data input to output time of 33 milliseconds. The data transfer time from adapter 12 to controller 14 is a maximum of 20 milliseconds and an average time of 15 milliseconds, and the data transfer time from controller 14 to adapter 18 is a maximum of 20 milliseconds with an average of 15 milliseconds. Further, for example, the scan throughput of a controller of network A has a maximum of 6 milliseconds and an average of 3 milliseconds. New data is presented to the program between scans. The program scan takes at least 3 milliseconds and is asynchronous to the network.

In comparison, implementing timer 40 in network B results in a maximum data input to output time of 28 milliseconds and an average of 23 milliseconds. The data transfer time from adapter 12 to controller 14 is a maximum of 11 milliseconds and an average of 10 milliseconds. Similarly, a data transfer from controller 14 to adapter 18 has a maximum transfer time of 11 milliseconds and an average transfer time of 10 milliseconds. The program of network B is similar to the program of network A in that new data is presented to the program between scans. The program scan takes at least 3 milliseconds, and is asynchronous to the network.

Figure 4:
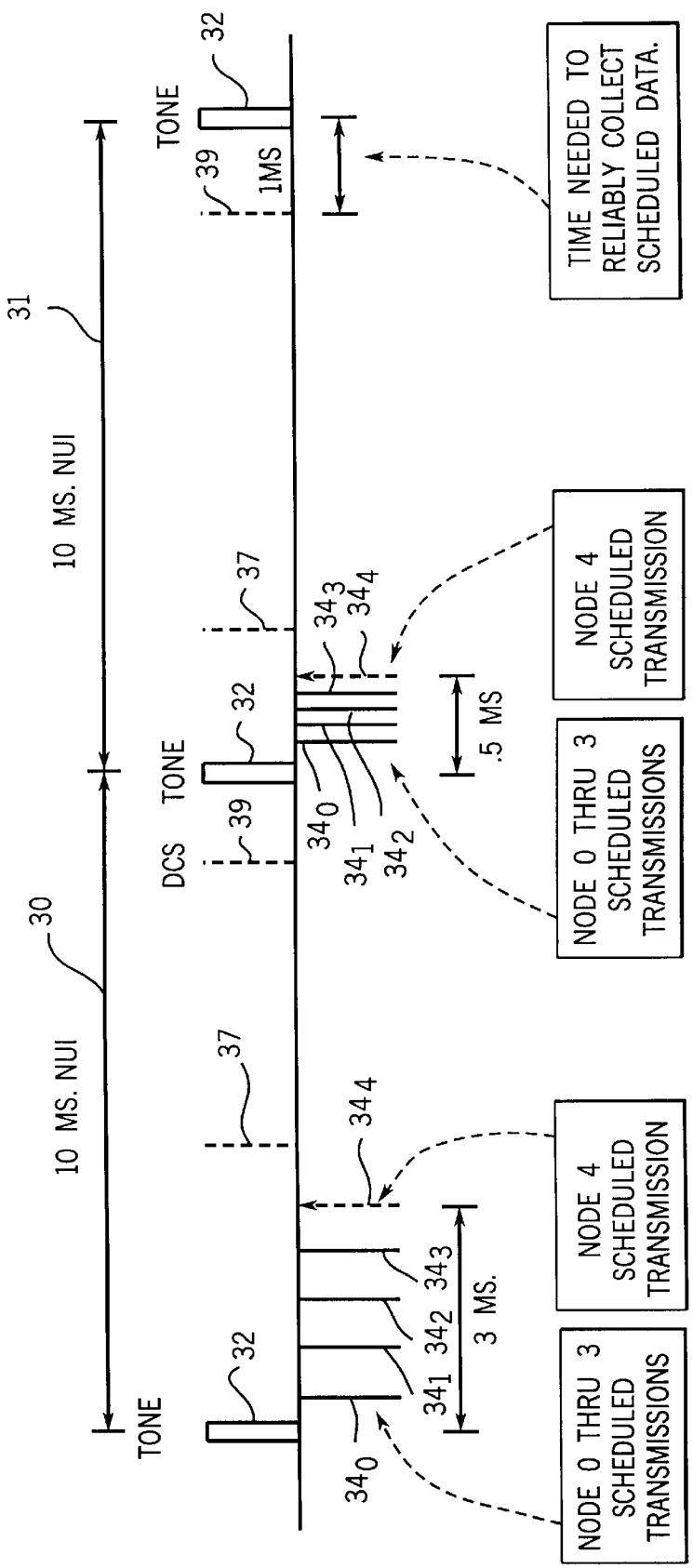
FIG. 4 is a timing diagram of a system according to FIG. 3.

FIG. 4 illustrates the use of timer 40 in FIG. 3 in more detail. As previously noted, the goal of providing just in time data transmission involves building a frame of a scheduled transmission data packet just before the packet is needed for transmission. It is difficult to predict how long it will take to build a frame and even more difficult to predict when the data will be needed. The data to be collected is of a known size, and therefore the amount of time it will take to collect and transfer can be determined, however, other non-maskable tasks such as the DMAing of transmitted and received data packets interfere with completion of this task.

It is known that in a controller based network such as network B, the point at which the data will be needed for transmission is non-deterministic, because the data transmitted by some nodes will change other nodes transmission time. This is illustrated in FIG. 4, where the scheduled transmission of data from the fourth node begins 3 milliseconds into the network update time (NUT) of the first network interval but only 0.5 milliseconds into the network update time (NUT) of the second network update interval (NUI) 31.

In the subject invention, some assumptions can be made to achieve better throughput of the system. First, if the data is completely reflected by the issuance of tone 32, then the goal of gathering the data sufficiently before transmission has been met. Second, an arbitrary adjustable amount of time prior to the issuance of tone 32 is selected in which to start collecting data.

To provide this variable time period before issuance of tone 32, in which to start collecting data, timer 40 is implemented according to the subject invention. As previously noted, issuance of interrupt 37 indicated that the data transmission had been completed and also doubled as a data collection start signal.

Figure 2:
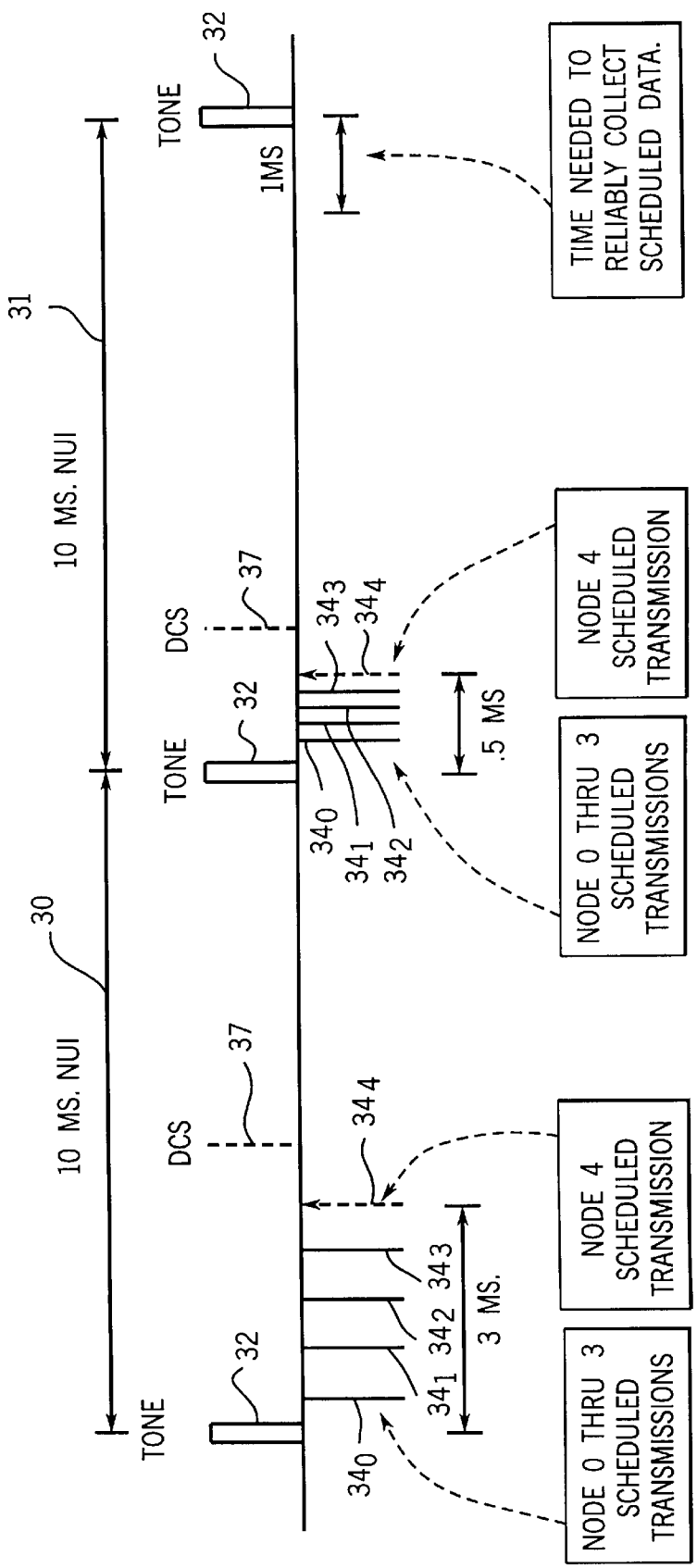
FIG. 2 is a control diagram of the data collection scheme according to a system such as illustrated in FIG. 1.

Timer 40 of FIG. 3 provides a one-shot time-out signal which is started at tone 32, and times out sufficiently ahead of the next issuance of tone 32 to allow all scheduled data to be collected. This feature is illustrated more particularly in FIG. 4, where data collection start (DCS) signal 39, is located closer to the beginning of tone 32 than interrupt 37. In this embodiment, the time period between DCS signal 39 and tone 32 is set at 1 millisecond. However, as previously noted timer 40 is variable and the time between the issuing of data collection start signal 39 and tone 32 may also therefore be varied. A comparison of FIGS. 2 and 4 illustrate the different timing of the start of data collection in comparison to the tone 32. In FIG. 2 there is significantly more time between interrupt 37 and tone 32 as compared with the time in from data collection start (DCS) signal 39 to tone 32 in FIG. 4. It is to be appreciated that while the timer 40 is started at the issuance of preceding tone 32, timer 40 can also be started at some other point during a NUI so as to time-out at the appropriate time.

Figure 5:
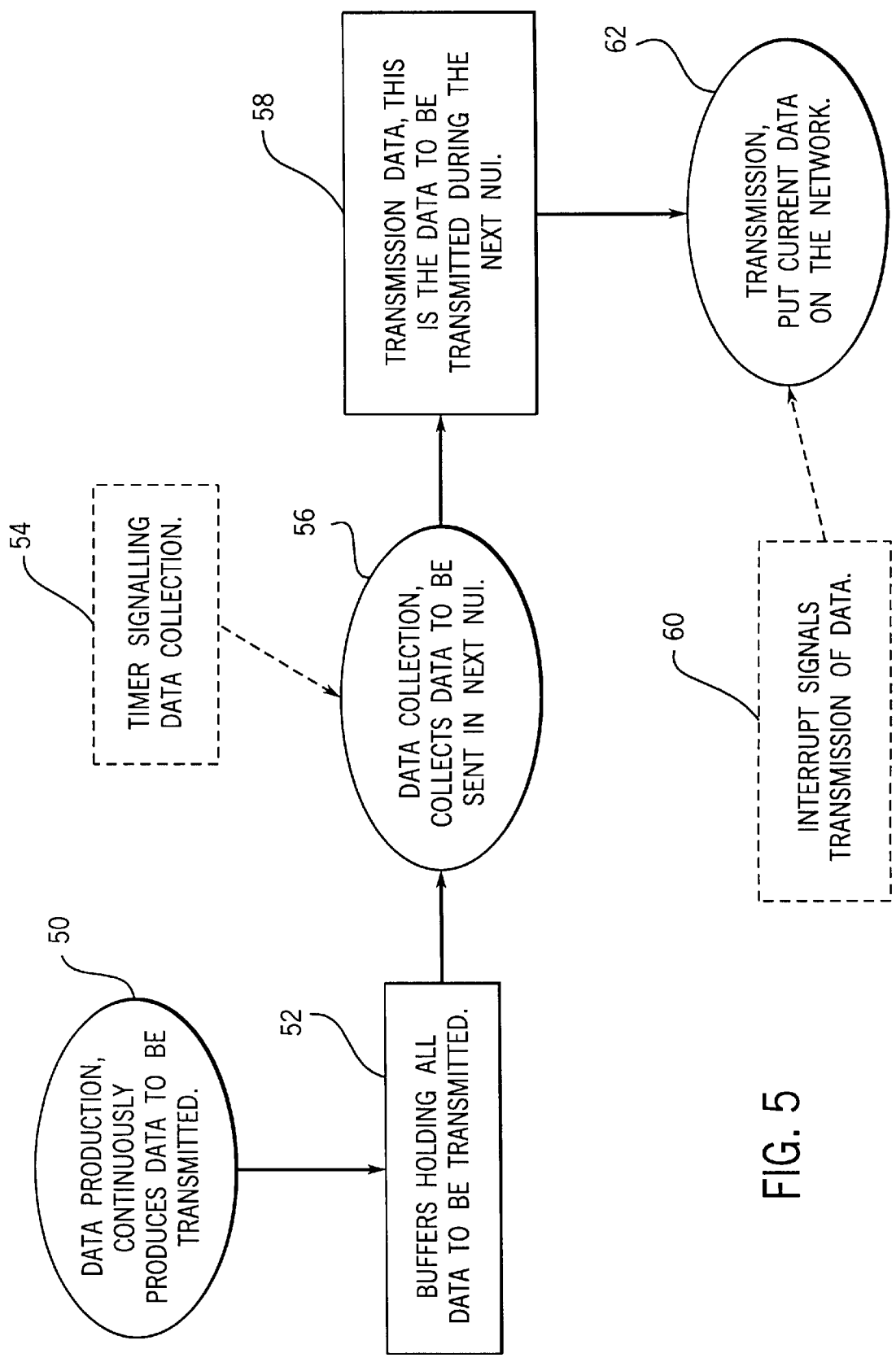
FIG. 5 is a flow diagram of a system according to the subject invention; and, FIG. 6 is a chart illustrating the improved flow through of a controller based network implementing the subject invention.

The flow of network B is illustrated in FIG. 5. Data is continuously produced or collected 50 from sensors 10a–10n of FIG. 3. This produced data is to be transmitted onto the network B. Buffers, which may be included in adapter 12, are provided to hold the data that is to be transmitted 52. In the present embodiment, timer 40 issues a data collection start (DCS) signal 54 when the data collection is to begin. In response to issuing of the DCS signal data which is to be sent during the next network update interval (NUI) is collected 56. After being collected the data is formed into the appropriate formats, such as data transmission packets to be transmitted during the next network update interval 58. Next, an interrupt signal is issued 60 signaling the start of data transmission, and in response thereto the collected data is placed on the network B.

Use of a timer 40 allows for the beginning of data collection to be adjusted so as to optimize data collection.

An example of the increased throughput of a control network implementing the subject invention may be seen by comparison of FIGS. 2 and 4. Particularly, in the system according to FIG. 2, if data which should be collected is missed by a very small time period, such as a microsecond or a nanosecond, the data will have to wait for a next network update interval (NUI). Therefore, the data waits in a buffer for the next data collection to start and then the time between the data collection and the transmission, which is when data will actually go out to the network. In network A of FIG. 2 the data can wait for as much as two times the network update interval (i.e. 2×NUI, or in FIG. 2, 20 milliseconds) between the time data is written or received from a sensor to the time it is transmitted through network A. On the other hand, if as according to the subject invention, the data collection start 39 signal is moved closer to the data transmission point, e.g., within 1 millisecond the tone 32, then the worse case scenario is that missed data will wait for transmission 1 millisecond plus one NUI, instead of the two NUIs of FIG. 2.

In existing systems, the same signal which indicates that data transmission has ended is also used to start data collection for the next data transmission. This arrangement leads to a situation where new data can be written to a location after data has already been collected, resulting in older than desired data being transmitted. Therefore the present invention collects data at the latest possible moment in order to have the most recent data ready for transmission. By such an arrangement, data flow of the controller based network is increased.

The chart in FIG. 6 provides a sample of the improvement the inventors have found in throughput performance achieved by implementation of the present invention. The chart reflects the throughput times in a controller based network using PLC-5/C and 1771-ACN products from Allen Bradley Corporation. Each entry includes average, maximum and minimum measured throughput times in milliseconds. The test measured the time it takes for a PLC-5/C output to be sent to a 1771-ACN, loop back through a SIM module, be sent by the 1771-ACN, and finally read by the PLC-5/C.

This invention has been described with reference to the preferred embodiment. Obviously, modifications and alterations will occur to others upon a reading and understanding of this specification. It is intended that all such modifications and alterations be included insofar as they come within the scope of the appended claims or the equivalents thereof.

Having thus described the invention, it is now claimed:

1. A controller based network comprising:
   a sensor configured to sense and acquire data representing a state of a device or event with which the sensor is associated;
   an input/output device in operative connection with the sensor, the input/output device receiving the data acquired by the sensor;
   a controller in operative connection with the input/output device so as to receive the data and generate commands based on the received data including commands for transmission of the data scheduled to be transmitted during a network update interval, the controller further including a data collection start signal generator which issues a data collection start signal; and
   a timer having an adjustable time-out period, wherein when the timer reaches the time-out period the data collection start signal is issued, and wherein the timer is configured such that the time-out period is reached sufficiently ahead of a start of a next network update interval to allow all of the scheduled data to be collected for transmission by the controller.

2. The network according to claim 1 wherein the time-out period of the timer is adjustable.

3. The network according to claim 1 wherein the timer is a part of the controller.

4. The network according to claim 1 wherein the timer is independently constructed from the controller.

5. The network according to claim 1 wherein data is placed onto the network in a structured manner to avoid collisions of different data attempting to gain access to the network.

6. The network according to claim 5 wherein the data is provided from a plurality of nodes and data from each of the nodes is placed onto the network in a predetermined scheduled order.

7. The network according to claim 6 wherein the data from the plurality of nodes is provided onto the network during a network update interval.

8. The network according to claim 1 wherein use of the timer results in a maximum data input to output time of approximately 28 milliseconds and an average data input to output time of approximately 23 milliseconds.

9. A controller based network comprising:
- a sensor which acquires data representing a state of a device or event;
- an input/output device in operative connection with the sensor for receiving the data; and,
- a controller in operative connection with the input/output device, including a program which generates a data transmission signal issued to begin transmission of the data acquired by the sensor onto the controller based network and scheduled to be transmitted during a network update interval; and,
- a timer which functions to generate a data collection start signal issued at an adjustable time after the start of the network update interval, and wherein the timer is configured such that the time-out period is reached sufficiently ahead of a start of a next network update interval, to allow all of the scheduled data to be collected for transmission by the controller.

10. The network according to claim 9 wherein the data provided to the network during a network update interval is sent to the network according to a predetermined scheduled order.

11. The network according to claim 10 wherein the network update interval time is a set constant value.

12. The network according to claim 10 wherein the data is from a plurality of nodes, such that data from a first node is placed onto the network before data from a second node.

13. The network according to claim 12 wherein data from the plurality of nodes is sent to the network during a network update time which can vary.

14. The network according to claim 13 wherein the data collection start signal is set to issue approximately one millisecond prior to issuance of the data transmission signal.

15. The network according to claim 9 wherein use of the timer results in a maximum data input to output time of approximately 28 milliseconds and an average of approximately 23 milliseconds.

16. A method of transmitting data in a controller based network, the method comprising the steps of:
- sensing by a sensor, data of a device or event;
- providing the data to an input/output device of the controller based network;
- issuing a time variable data collection start signal, during a network update interval;
- collecting the data to be transmitted onto the network;
- forming the collected data into transmission data to be transmitted onto the network during the network update interval, wherein the time variable data collection start signal is issued sufficiently ahead of a next network update interval to allow all of the data scheduled for transmission to be formed into the transmission data;
- issuing a data transmission signal to begin transmission of data onto the network; and,
- transmitting the transmission data onto the network following the issuance of the data transmission signal.

17. The method according to claim 16 wherein the network update interval is a set time period.

18. The method according to claim 16 wherein the data collection start signal is issued 1 millisecond before the data transmission signal.

19. The method according to claim 18 wherein the data collection start signal and data transmission signal are issued during a network update interval.

* * * * *